INVENTOR
Louis E. Belcastro
BY Geoffrey Knight
ATTORNEY

INVENTOR
Louis E. Belcastro
BY
Geoffrey Knight
ATTORNEY

United States Patent Office 3,045,187
Patented July 17, 1962

3,045,187

MULTI-TIMING SINGLE SHOT USING ELECTRONICALLY SELECTED CONSTANT CIRCUITS

Louis E. Belcastro, Wappingers Falls, N.Y., assignor to International Business Machines Corporation, New York, N.Y., a corporation of New York Filed June 18, 1959, Ser. No. 821,292
5 Claims. (Cl. 328—207)

This invention relates to single shot multivibrator circuits and more particularly to such circuits where the duration of the output of a single shot multivibrator is electronically controlled.

Certain computer components must be used with different timing cycles when being used in connection with different associated components. If these differently timed outputs are needed, the component containing the timing circuit must usually, of necessity, have a multivibrator circuit for each timing desired, or the timing must be manually controlled by varying the value of a capacitor, resistor, or a voltage.

It is a general object of this invention to provide improved and simply constructed timing circuits which are capable of providing a plurality of electronically controlled timed outputs of a mono-stable multivibrator.

It is another object of this invention to provide such a circuit employing but a single multivibrator stage.

These and other objects of the invention are attained in accordance with one specific embodiment wherein the duration of the output pulse is controlled by selectively choosing which of a plurality of capacitors will be used with one resistor so that the RC time constant of the multivibrator may be electronically and selectively chosen. The particular capacitor to be used is chosen by applying a gate of a certain potential to diodes associated with each capacitor. If a capacitor is to be kept out of the circuit, the gate is of such a potential as to bias the diodes to isolate the capacitor from the circuit.

The output of the multivibrator commences when an input signal is received, and the duration is controlled by the charging of the electronically chosen timing capacitor which returns the circuit to its quiescent state where it remains until another input signal is received.

The foregoing and other objects, features and advantages of the invention will be apparent from the following more particular description of preferred embodiments of the invention, as illustrated in the accompanying drawings.

Figure 1:
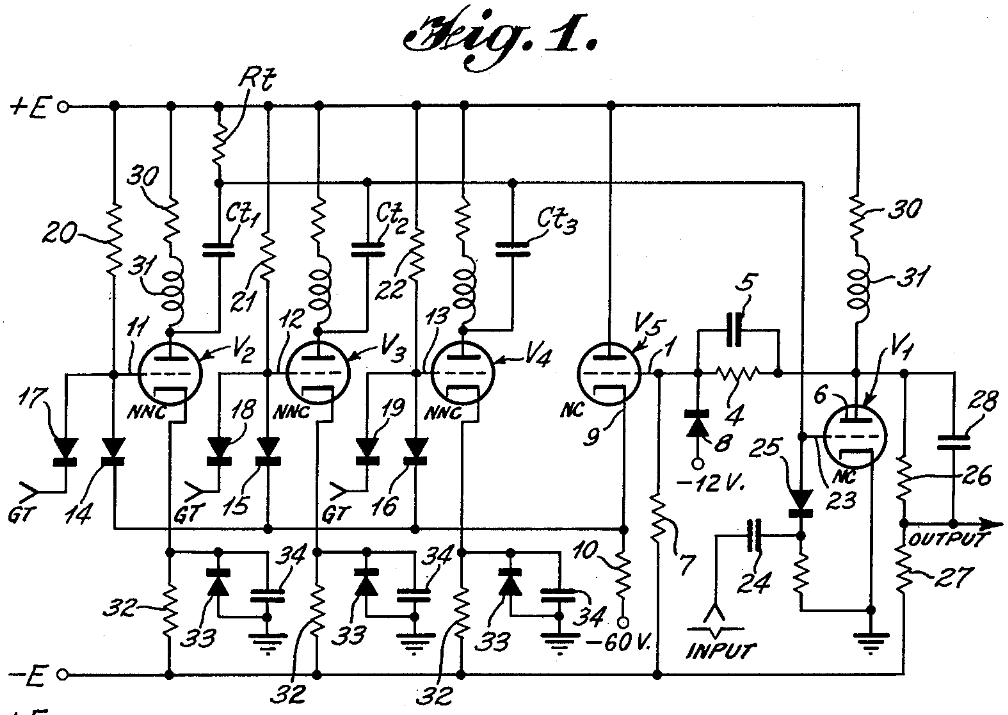
FIG. 1 is a wiring diagram in accordance with one embodiment of the present invention wherein capacitors are electronically chosen to control the output duration.

A capacitor switching embodiment of this invention is shown in the circuit of FIG. 1.

A combination of tubes V1 and V2 or V3 or V4 comprise the multivibrator. Tube V5 is a cathode follower and acts as a driving tube. In the quiescent state, V1 is conducting and V2, V3, and V4 are cut off. In the drawings, a normally conducting element is labeled NC and a normally non-conducting element NNC. The voltage at grid 1 of tube V5, controlled by the divider network consisting of resistor 4, and capacitor 5 connected in parallel to the plate 6 of V1, and resistor 7 connected to a negative potential, is clamped at −12 v. by diode 8. The voltage at the cathode 9 across resistor 10 of V5 is applied to the grid 11 of V2, grid 12 of V3, and grid 13 of V4. This voltage is at −12 v. and is coupled to the respective grids 11, 12, and 13 by diodes 14, 15, and 16, respectively, holding tubes V2, V3 and V4 at cut off.

The circuit is conditioned by applying a gate potential, labeled GT in the drawings, at diodes 17, 18 and 19 associated with tubes V2, V3 and V4, respectively. The gate will be considered "up" when it is at +10 v. and "down" when at −30 v.

To show one complete cycle of operation of this circuit it will be assumed that it is desired to have the duration of the output controlled by capacitor C*t*1. This choice can be made by causing the gate at diode 17 to be "up" and the gates at diodes 18 and 19 to be "down." Diodes 14 and 17 act as an AND gate. With the circuit in its quiescent state, the cathode 9 of V5 will be at about −12 v. With +10 v. applied to the cathode of diode 17, and −12 v. applied to the cathode of diode 14, diode 17 will be back biased, with −12 v. being applied to the grid 11 of V2.

To start the timed output, a negative going input pulse is momentarily applied to the grid 23 of V1 through capacitor 24 and diode 25. Tube V1 is cut off. The voltage at the plate 6 of V1 rises. The output voltage is taken from the connection of resistor 27 and resistor 26 which is shunted by capacitor 28.

The positive swing of voltage at plate 6 of V1 is coupled to the grid 1 of V5 through the voltage divider consisting of resistor 4, capacitor 5, and resistor 7. The voltage at grid 1 of V5 will shift from −12 v. to +15 v. The voltage shift at the cathode 9 of V5 will be from −12 v. to +10 v. The positive shift of voltage to +10 v. will satisfy the AND condition and this entire rise of voltage at the cathode 9 of V5 will be applied to the grid 11 of V2 causing it to start conducting.

The positive shift of voltage at the cathode 9 of V5 will not be coupled to either V3 or V4 as diodes 18 and 19 are forward biased because the gate is "down" on both of them causing diodes 15 and 16 to be back biased with −30 v. applied to their plates. V3 and V4 will remain cut off and have no effect on the circuit, as the AND condition is not satisfied to cause their grids to follow the rise of voltage at the cathode 9 of V5.

The positive shift of voltage at grid 11 of V2 will cause V2 to start conducting, lowering the voltage at the plate 29 of V2. Capacitor C*t*1 will charge through R*t* and when the voltage rises sufficiently at the grid 23 of V1, tube V1 will start to conduct and switching takes place returning the circuit to its quiescent state. The length of time that V1 remains cut off is determined by the RC time constant of C*t*1 and R*t*.

If it is desired to change the duration of the output, the RC time constant may be changed by choosing C*t*2 to act with R*t*. The gate at diode 18 is changed to be "up" and the gates at diodes 17 and 19 "down." When an input is applied at grid 23 of V1 the same sequence of events takes place except that the positive shift of voltage at the cathode 9 of V5 is coupled to the grid 12 of V3 turning V3 on. V2 and V4 remain cut off and C*t*2 now charges through R*t* to determine when the voltage level on the grid 23 of V1 reaches the required level to turn V1 on again causing the circuit to return to its quiescent state.

A time duration controlled by C*t*3 may also be chosen in the same manner as before by conditioning the gate at diode 19 "up" and the gates at diodes 17 and 18 "down."

Any number of time durations may be provided for by using additional tubes such as V2, V3 and V4. In the plate circuit of each tube will be a resistor 30, and inductor 31, and in the cathode circuit will be resistor 32 and a diode 33 in parallel with a capacitor 34 between the cathode 35 and ground.

Figure 2:
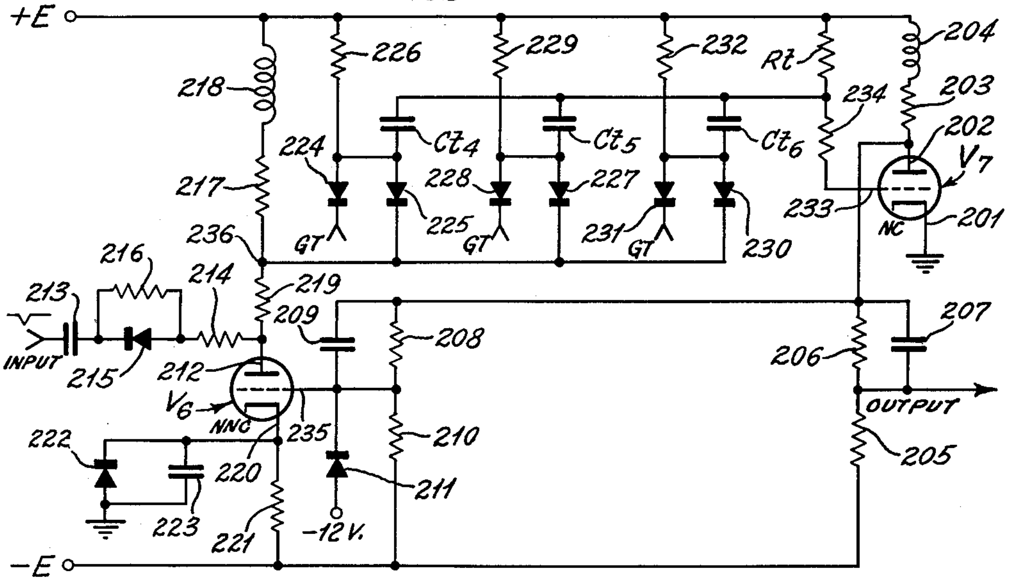
FIG. 2 is a wiring diagram in accordance with another embodiment of the invention wherein capacitors are electronically chosen to control the output duration.

FIG. 2 is another embodiment of this invention wherein capacitors are switched, but the circuit requires only two tubes.

The multivibrator consists of two tubes V6 and V7. V7, which is the output tube and which is conducting in the quiescent state, has a cathode 201 connected to ground and three networks connected to its plate 202. These networks consist of a plate load network, resistor 203 and inductor 204, the output network consisting of resistor 205 and resistor 206 which is in parallel with capacitor 207, and a voltage divider network consisting of resistor 208 and capacitor 209 in parallel, connected in series with resistor 210 and diode 211. The output is taken between resistors 205 and 206. V6 is off in the quiescent state with its grid clamped to −12 v. by diode 211. To the plate 212 of V6 is coupled, the input through capacitor 213 and resistor 214 in series with diode 215 and resistor 216 connected in parallel, and the plate load circuit consisting of resistor 217 and inductor 218 and resistor 219. To the cathode 220 of V6 is connected a negative potential through resistor 221 and ground through diode clamp 222 and capacitor 223 connected in parallel.

The gate circuits consist of diodes 224, 225 and resistor 226, diodes 227, 228 and resistor 229, and diodes 230, 231 and resistor 232. A gate will be considered "up" when at +140 v. and "down" when at +50 v.

The circuit operation will be considered first in connection with the gate circuit comprising diodes 224, 225, resistor 226, the timing capacitor C*t*4, and resistor R*t*.

In the quiescent state V7 will be conducting as the grid 233 will be positive because of the +140 v. through R*t* and resistor 234. The output of the divider connected to plate 202 of V7 will be down and the grid 235 of V6 will be held at −12 v. holding V6 cut off.

Operation of the circuit is dependent upon the condition of the gate applied to diode 224.

Assuming first that the gate is "down," diode 224 will be forward biased and conducting heavily holding the point at the junction of diode 225 and C*t*4 at+50 v. A negative pulse is momentarily applied to plate 212 of V6 causing the voltage at poin 236 to fall to +50 v. This voltage shift is not enough to overcome the bias on diode 225 and will not be passed by diode 225 which has +50 v. applied to its plate. The same will also be true with respect to C*t*5 and C*t*6 if their respective gates are "down."

Now assume that the gate is "up" at diode 224. The AND condition of the two diodes is met, and the junction of the two diodes will be at about 140 v. When the negative input is applied at plate 212 of V6, the shift of voltage to +50 v. at point 236 will remove the satisfaction of the AND condition, and the voltage at the left-hand plate of C*t*4 will fall to +50 v. C*t*4 will charge through resistor R*t*, and the voltage at the grid 233 of V7 will fall, to cut off conduction of V7. This now is the start of the timed output. The rise in voltage at plate 202 of V7 will be transmitted through the divider network to the grid 235 of V6 turning V6 on and holding point 236 at +50 v. V7 will remain cut off the length of time required for the grid 233 of V7 to rise to a level to render V7 conductive, determined by the RC time constant of R*t* and C*t*4. At this level, V7 turns on causing the output to shift and switches the circuit back to its quiescent state. C*t*4 is the only timing capacitor which attempts to charge to a different potential, as C*t*5 and C*t*6 will still have +50 v. applied to their left-hand plates with the gate of +50 v. applied to diodes 228 and 231.

A different timed output may be achieved by the same circuit operation if the gates to diodes 224, 228, and 231 are conditioned properly; thus any desired duration of the output may be electronically chosen by having different values for C*t*4, C*t*5 and C*t*6, and by conditioning their respective gates properly.

It should be noted that many different durations of output may be achieved with only the one two-tube multivibrator by connecting the desired number of timing capacitors and associated gate circuits in parallel, at point 236 and at point 237.

It should also be noted that when any gate is dropped from +140 v. to +50 v. it will cause the multivibrator to time-out once because the voltage level across any of the timing capacitors will change and be reflected to the grid 233 of V7.

It all gates are "down," the output will not switch when an input is applied, so the multivibrator can also be conditioned not to give an output unless desired, although inputs are continuously being applied.

Figure 3:
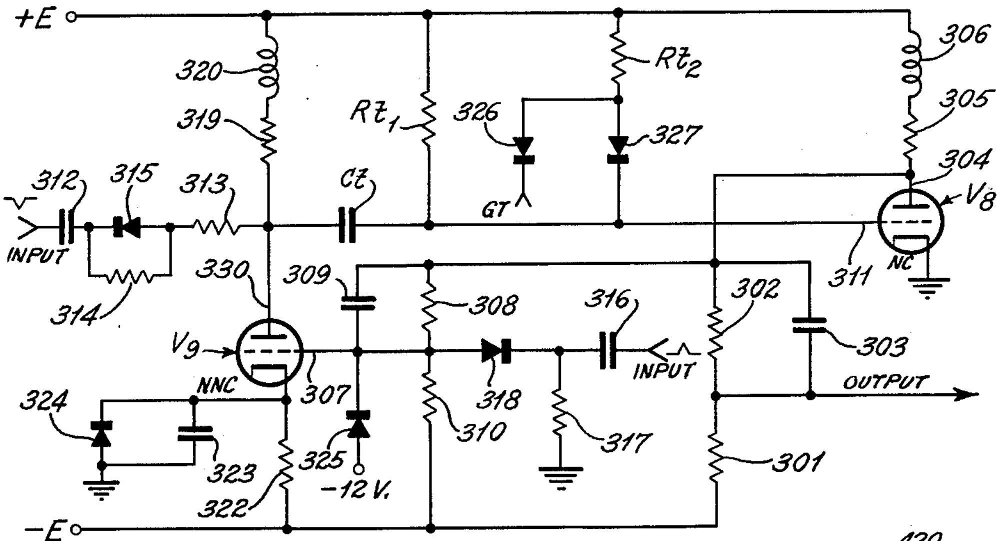
FIG. 3 is a wiring diagram in accordance with still another embodiment of the present invention wherein resistors are electronically chosen to control the output duration.

In FIG. 3 is shown another embodiment of this invention wherein an electronic choice is made between resistors to control the duration of the output of the single shot multivibrator.

The output of the multivibrator is taken between resistor 301 and resistor 302 in parallel with capacitor 303. This network is connected to the plate 304 of V8. The plate load for V8 consists of resistor 305 and inductor 306. The coupling from the plate 304 of V8 to the grid 307 of V9 is accomplished through the divider network consisting of resistor 308 in parallel with capacitor 309 in series with resistor 310.

A negative going input trigger is momentarily applied to the plate 330 of V9 by the capacitor 312 in series with resistor 313 which are in series with resistor 314 and diode 315 connected in parallel; and is further coupled to the grid 311 of V8 through timing capacitor C*t*. A positive input can also be applied to the grid 307 of V9 through the network consisting of capacitor 316, resistor 317 and diode 318. The plate load of V9 consists of resistor 319 and inductor 320. The cathode 321 of V9 is connected to a negative potential through resistor 322 and clamped to ground through capacitor 323 and diode 324 which is forward biased.

In a quiescent state, V8 is conducting and V9 is cut off. Through the combination of the divider network at the plate 304 of V8 and the diode 325 connected to −12 v., the grid 307 of V9 will be at −12 v. holding it well below cut off.

The gate network for this circuit is composed of diode 326, diode 327 and R*t*2. The gate will be considered "up" when it is +10 v. and "down" when at −100 v. Silicon diodes are used for diodes 327 and 326 to utilize their property of having a low forward biased resistance (in the order of 100 ohms), and a high reverse biased resistance (in the order of 10–15 megohms).

The single shot multivibrator action of this circuit is like any other. When an input is momentarily applied, either negative at capacitor 312 or positive at capacitor 316, the switching action starts. If a negative pulse is applied at grid 311 of V8, the plate voltage of V8 and the output rise. The rise of plate voltage of V8 is coupled through the divider network to grid 307 of V9 causing it to conduct, lowering the voltage at its plate 330. This switching action takes place almost instantaneously. The timing capacitor C*t* now starts to charge to bring the voltage at grid 311 of V8 from −85 v. at the time the switching started to −3 v. which will again cause V8 to conduct to switch the circuit back to its quiescent state. Timing capacitor C*t* charges through an electronically chosen combination of either R*t*1 alone or the parallel combination of R*t*1, R*t*2 and diode 327.

For the first example assume the gate at diode 326 is "down," or at −100 v. As the switching action starts, the initial charging current through C*t* will cause a drop across R*t*, to bring the grid 311 of V8 and the cathode of diode 327 to about −85 v. Diode 327 will be back biased and will present a very high resistance to the charging current of $C_t$. $C_t$ will therefore charge at a rate determined primarily by $R_{t1}$.

If the gate applied to diode 326 is "up," or at +10 v., the initial surge of charging current through $C_t$ which causes the −85 v. drop applied to the grid 311 of V8 and the cathode of diode 327, will forward bias diode 327. The charging of $C_t$ will now be controlled by the parallel combination of $R_{t1}$ and $R_{t2}$ in series with the low resistance of diode 327. A different output duration is thus achieved by controlling the charge path of $C_t$ by the gate applied.

Figure 4:
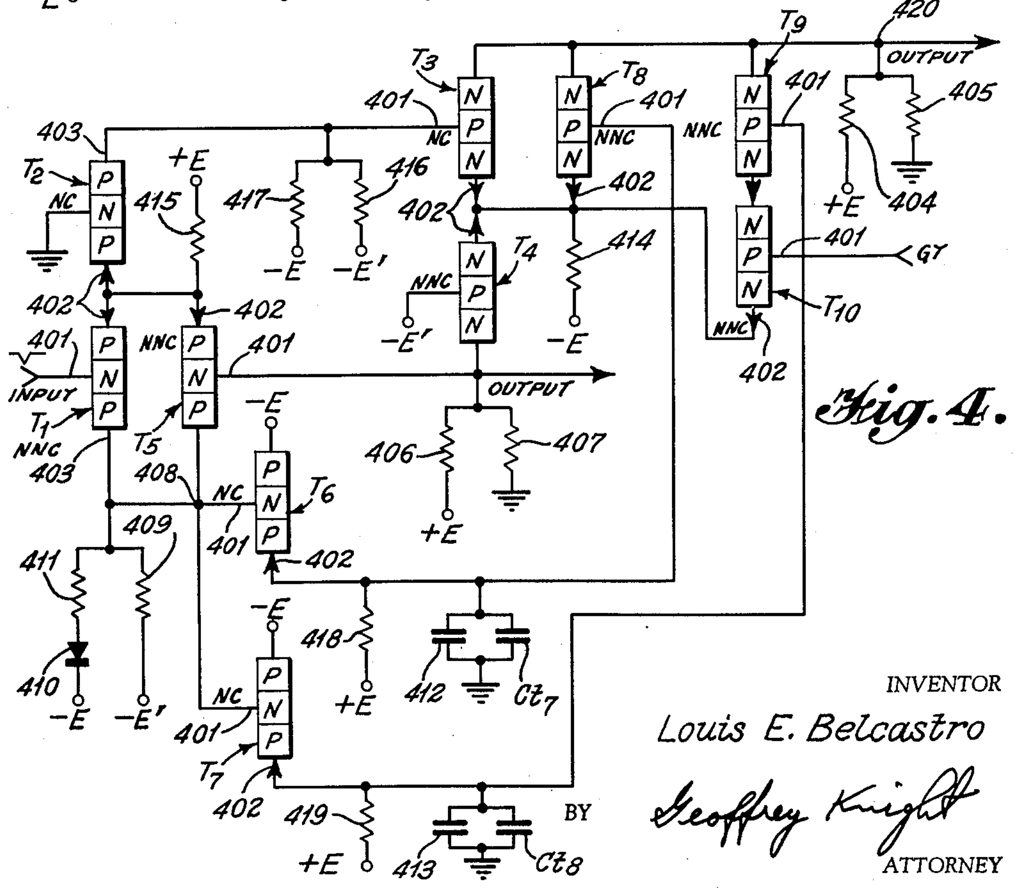
FIG. 4 is a wiring diagram in accordance with a further embodiment of the present invention wherein transistors are used and the duration of the output is electronically controlled.

FIG. 4 shows another embodiment of this invention wherein transistors are used and the output duration is electronically controlled by electronically choosing which of a plurality of timing capacitors will control the output duration.

Each transistor T1, T2, T3, T4, T5, T6, T7, T8, T9 and T10 has the usual three transistor electrodes; base 401, emitter 402 and collector 403. One output which is a positive output may be taken between resistor 404 and resistor 405, or a negative going output may be taken between resistor 406 and resistor 407.

In the quiescent state, biasing of the circuit causes the transistors to be on or off in the following combination: T1—off, T2—on, T3—on, T4—off, T5—off, T6—on, T7—on, T8—off, T9—off, and T10 will be held off when its base 401 is held at −7 v. (gate down), and will be conditioned to turn on when its base 401 is held at −5 v. (gate up).

With the input to base 401 of T1 held at +1 v., which holds T1 and T5 off, point 408 is held at about −12 v. through resistor 409. Diode 410 is reverse biased blocking current through resistor 411. With point 408 at −12 v., T6 and T7 will be conducting heavily holding both their emitter 402 at about −12 v., which will also be the charge on capacitors $C_{t7}$ in parallel with capacitor 412, and $C_{t8}$ in parallel with capacitor 413.

T3, T4 and T8 form a current switching arrangement drawing their current through resistor 414 so that only one may be on at one time. T1, T5 and T2 form a current switching network drawing current through resistor 415, so that only one of the three will be on at any one time.

To show one cycle of operation, it will be assumed that the gate to the base 401 of T10 is "down," so that T10 is held cut off.

The input to the base 401 of T1 is shifted from +1 v. to −1 v. causing T1 to switch on. When T1 switches on, T2 switches off and T5 remains off. When T2 switches off, the voltage between resistor 416 and resistor 417 decreases causing T3 to cut off allowing T4 to turn on. T8 is held cut off by the −12 v. across $C_{t7}$ applied to its base 401. When T3 and T4 switch, the output between resistors 404 and 405 rises, and the output at the collector 403 of T4 decreases, and the timed output commences.

When the input pulse at base 401 of T1 is removed, T1 switches off, and T5 is turned on. A latch circuit has now been completed through T2, T3, T4 and T5.

When the input was applied at T1, turning it on, current was drawn through resistor 409, and the voltage at point 408 applied to the bases 401 of T6 and T7 rose to about −6 v. tending to cut off T6 and T7. The voltage at the emitters 402 of T6 and T7 were at about −12 v. in the quiescent state and the timing capacitors $C_{t7}$ and $C_{t8}$ were charged to that amount. As T6 and T7 tend to turn off, timing capacitors $C_{t7}$ and $C_{t8}$ start to charge through resistors 418 and 419 respectively to the +6 v. at the emitters of T6 and T7. $C_{t7}$ and $C_{t8}$ are at different values, so they will charge at a different rate. In the embodiment shown, $C_{t7}$ will have the slower charging rate.

The voltage at the base 401 of T9 will reach −5.7 v. first, which is the value that will cause T9 or T8 to conduct. Since T10 is biased so as not to turn on, T9 has no current path through which to conduct and will remain cut off.

Some time later, the voltage at base 401 of T8 will reach −5.7 v., and will switch on. It is at this instant the output voltages shift back to their quiescent level. As T8 switches on, T4 will switch off, T5 will be cut off. As T5 cuts off, point 408 again returns to −12 v. causing the timing capacitors $C_{t7}$ and $C_{t8}$ to rapidly discharge through T6 and T7 which now are again conducting heavily. The voltage across the timing capacitors is coupled to the base 401 of T8 causing it to cut off again, switching conduction back to T3. As T5 was cut off, and with T1 already off, T2 again conducts, and the circuit is returned to its quiescent state.

To show that another duration of output may be achieved electronically it will now be assumed the gate to the base 401 of T10 is "up," or at −5 v. The same sequence of operation takes place as before. The RC time constant of $C_{t8}$ and resistor 419 is shorter than $C_{t7}$ and resistor 418, so the voltage to the base 401 of T9 will rise to −5.7 v. before it will at the base 401 of T8. T9 will conduct through T10 which now turns on, robbing current from T4 cutting it off, breaking the latch to T5, and the circuit returns to its quiescent state ending the timed output.

Additional timed durations may be provided for by including in the circuit additional components like T9, T10, $C_{t8}$, capacitor 413, resistor 419, and T7, connected in parallel at point 408 and point 420, and with the emitter of the transistor comparable to T10 connected to resistor 414.

While the invention has been particularly shown and described with reference to preferred embodiments thereof, it will be understood by those skilled in the art that various changes in form and details may be made therein without departing from the spirit and scope of the invention.

I claim:

1. In an apparatus of the class described, an electron device having at least an output electrode and a control electrode, output circuit means coupled to said output elecrode, biasing means including a source of voltage and circuit means for connecting said source of voltage to said electron device electrodes, said biasing circuit means being adapted normally to maintain a voltage on the control electrode of said electron device to condition said device in one of two conductivity states, means to apply a voltage pulse to the control electrode of said electron device to switch it to a second conductivity state, timing means adapted to restore said electron device to said first conductivity state after a predetermined duration, said timing means including said biasing circuit means, and a plurality of different value timing elements, and voltage controlled electronic switching means for electronically coupling selected ones of said timing elements to said biasing circuit means.

2. In an apparatus of the class described, an electron discharge device having at least an output electrode and a control electrode, output circuit means coupled to the output electrode, biasing means including a source of voltage and circuit means for connecting said source of voltage to said electron discharge device electrodes, said biasing circuit means being adapted normally to maintain a voltage on the control electrode of said electron discharge device to condition said device in one of two conductivity states, means to apply a pulse to the control electrode to switch said electron discharge device to a second conductivity state, a plurality of selectively controlled timing circuits including said biasing circuit means adapted to maintain said device in the second conductivity state, and to restore the normal voltage on the control electrode of said electron discharge device to restore said device to its first conductivity state after a predetermined timed duration, each of said timing circuits including a timing element, and switching means responsive to a gate potential and the change of conductivity state of said electron discharge device to control which one of said timing circuits will be effective.

3. In an apparatus of the class described, a first electron discharge device having at least an output electrode and a control electrode, biasing means including a source of voltage and circuit means adapted normally to maintain a voltage on the control electrode of said first device to condition said first device in one of two conductivity states, input circuit means including a plurality of timing elements and said biasing circuit means adapted to apply a pulse to the control electrode of said first device to switch said device to a second conductivity state, means including a second electron discharge device and said timing elements responsive to the change of conductivity state of said first device to restore said first device to the first conductivity state after a predetermined duration, and electronic switching means including said source of voltage for selectively controlling which of said timing elements will be effective.

4. In an apparatus of the class described, a first electron discharge device having at least an output electrode and a control electrode, output circuit means coupled to said output electrode, biasing means including a first timing element and a source of voltage adapted normally to maintain a voltage on the control electrode of said first device to condition said device in one of two conductivity states, input circuit means including said first timing element adapted to apply a pulse to the control electrode of said first device to switch said first device to a second conductivity state, timing means including at least a second normally ineffective timing element, said first timing element and a second electron discharge device responsive to the change of conductivity state of said first electron discharge device adapted to normally restore said first device to its normal conductivity state after a predetermined duration, and electronic switching means for selectively causing said second timing element to be effective with said first timing element to produce a second predetermined duration.

5. In an apparatus of the class described, a first output transistor having at least an output electrode and a control electrode, a second output transistor having at least an output electrode and a control electrode, means including a source of voltage and circuit means for connecting said source of voltage to electrodes of said first and second transistors adapted to normally condition said transistors in opposite states of conductivity, means to apply a triggering pulse to the control electrode of said first transistor to switch the conductivity state of said first and second transistors, latching means responsive to the change of conductivity state of said transistors to maintain said transistors in the second conductivity state, timing means including a plurality of timing elements initiated by said triggering pulse adapted to restore the normal voltage to the control electrode of said second transistor to switch said first and second transistors to their normal conductivity state, and electronic switching means for selectively controlling which of said timing elements will be effective.

References Cited in the file of this patent

UNITED STATES PATENTS

| | | |
|---|---|---|
| 2,540,539 | Moore | Feb. 6, 1951 |
| 2,752,508 | Zito | June 26, 1956 |

FOREIGN PATENTS

| | | |
|---|---|---|
| 563,407 | Canada | Sept. 16, 1958 |

UNITED STATES PATENT OFFICE

CERTIFICATE OF CORRECTION

Patent No. 3,045,187 — July 17, 1962

Louis E. Belcastro

It is hereby certified that error appears in the above numbered patent requiring correction and that the said Letters Patent should read as corrected below.

In the heading to the drawings, Sheets 1 and 2, lines 2 and 3, and in the heading to the printed specification, lines 2 and 3, title of invention, for "MULTI-TIMING SINGLE SHOT USING ELECTRONICALLY SELECTED CONSTANT CIRCUITS", each occurrence, read -- MULTI-TIMING SINGLE SHOT USING ELECTRONICALLY SELECTED TIME CONSTANT CIRCUITS --; column 4, line 13, for "It" read -- If --; column 6, line 42, for "elecrode" read -- electrode --.

Signed and sealed this 27th day of November 1962.

(SEAL)

Attest: ESTON G. JOHNSON

XBRXXESXKXWXSWIDEEX

Attesting Officer

DAVID L. LADD

Commissioner of Patents